US011151295B1

(12) United States Patent
Bustan et al.

(10) Patent No.: US 11,151,295 B1
(45) Date of Patent: Oct. 19, 2021

(54) METHOD AND SYSTEM FOR SEQUENTIAL EQUIVALENCE CHECKING

(71) Applicant: Cadence Design Systems, Inc., San Jose, CA (US)

(72) Inventors: Doron Bustan, Zichron Yaakov (IL); Karam Abdelkader, Haifa (IL); Yaron Schiller, Kiryat Ono (IL)

(73) Assignee: CADENCE DESIGN SYSTEMS, INC., San Jose, CA (US)

( * ) Notice: Subject to any disclaimer, the term of this patent is extended or adjusted under 35 U.S.C. 154(b) by 0 days.

(21) Appl. No.: 17/077,187

(22) Filed: Oct. 22, 2020

(51) Int. Cl.
*G06F 30/3323* (2020.01)
*G06F 30/327* (2020.01)

(52) U.S. Cl.
CPC ........ *G06F 30/3323* (2020.01); *G06F 30/327* (2020.01)

(58) Field of Classification Search
USPC ........................................................ 716/120
See application file for complete search history.

(56) References Cited

U.S. PATENT DOCUMENTS

| 2018/0018416 A1* | 1/2018 | Iyer ..................... G06F 30/3312 |
| 2018/0018417 A1* | 1/2018 | Iyer ..................... G06F 30/3312 |
| 2020/0019653 A1* | 1/2020 | Gajavelly ............... G06F 30/33 |
| 2021/0192018 A1* | 6/2021 | Bhunia ................. G06F 21/602 |

\* cited by examiner

*Primary Examiner* — Mohammed Alam
(74) *Attorney, Agent, or Firm* — Pearl Cohn Zedek Latzer Baratz LLP (57) ABSTRACT

A method for enhancing performance of SEC of two representations of an electronic design (with and without gated clock) includes selecting one or more pairs of correlated flip-flops (FFs), a first FF of each pair in the first representation toggled by the gated clock controlled by an enable combinational logic and a second FF of the pair, correlating to the first FF, in the second representation toggled by the constantly toggling clock. The method also includes defining a modified enable combinational logic for the gated clock, as a disjunction of the enable combinational logic of the gated clock and an enable combinational logic for each FF of a plurality of FFs that are toggled by the gated clock. The method also includes performing SEC on the two representations design, using the modified enable combinational logic for the gated clock instead of the enable combinational logic of the gated clock.

20 Claims, 5 Drawing Sheets

| GCLK | En | Q | Qnext |
|------|----|----|-------|
| 0 →0 | * | * | Q |
| 0 →1 | 1 | * | D |
| * | 0 | * | Q |

METHOD AND SYSTEM FOR SEQUENTIAL EQUIVALENCE CHECKING

FIELD OF THE INVENTION

The present invention relates to formal verification. More specifically the present invention relates to methods and systems for sequential equivalence checking of two abstracted representations of an electronic design.

BACKGROUND OF THE INVENTION

Design verification is a common process for testing electronic designs (e.g., a newly designed integrated circuit, board, or system-level architecture), to, for example, confirm compliance with requirements that can be defined by a specification for that device.

In dynamic verification, the verification of electronic designs typically has several forms. At an early stage, before the electronic design is implemented in hardware, one form can include a simulation that can be conducted on a model of the design. Another form can be emulation, for example, in which one electronic hardware is used to mimic the behavior of another (e.g., a tested) electronic hardware. At more advanced stages of design development, another form of dynamic verification can test a system on chip that is verified, for example, in a process which is typically referred to as a post-silicon verification. Post-silicon verification can be a last stage in the electronic design development, for example, before it is commercially manufactured.

Formal verification, rather than testing a design under test (DUT), is typically aimed at proving or disproving whether a logic design complies with a formal specification by, for example, using mathematics.

Typically, in a verification process of electronic designs, a particular design can be modeled in multiple model formats where each model format can be different. The multiple different models can be called representations. Each model format for the particular design can be employed in various different stages of the design development and verification of the particular design. For example, at one development stage a design may be represented in a certain language (e.g., in Register Transfer Level—RTL—format, such as hardware description language—HDL), while at another stage the same design may be represented in a gate-level format and/or netlist format.

In formal verification abstraction may be used. Abstraction can involve a determination of the particular functionality that needs to be verified and at what level of detail, such that not all of the functionality and details of a particular design (e.g., electronic design) are verified during each verification process. Abstraction can also involve abstracting areas of a design which are known to increase complexity and/or run-time, such that a simpler representation of the design or part thereof can be used during the verification instead of the entire design. For example, abstraction can involve removing some elements (e.g., electrical elements, a resistor or gate) in the design that relate to certain functionality or functionalities, while maintaining other elements that relate to other functionality or functionalities.

Employing abstraction in verification can help focus on obtaining information that is relevant in a given context, while omitting information that relates to other non-relevant contexts. In many instances, abstraction may be used (e.g., introduced by a user, or automatically) to enhance the performance of formal verification engines.

In some cases, assume-guarantee abstractions may be applied. Assume-guarantee abstractions can require additional validation effort.

Combinational equivalence checking (CEC) may be used to formally prove that two representations of an electronic design are equivalent. In CEC, combinatorial logic between two sequential elements can be considered. However, sometimes there may exist two representations of an electronic design which are different at the combinational level and yet produce the same outputs when given the same inputs. For example, a particular design may include clock gating, which is a popular technique for power saving in electronic designs. Clock gating is typically used to disable clock toggling for flip-flops during selected clock cycles when these flip-flops are expected, according to the planned design, to be idle, to reduce power consumption of the design circuitry. Clock gating may be applied when using a gated clock—a clock that may be disabled or enabled in selected times. In this example, this particular design may be represented by two different representations, one which includes clock gating and one which does not. These two representations of the design may be declared as non-equivalent in CEC because clock gating affects reduced power consumption, although in terms of functionality they are equivalent. Therefore, as can be seen, a typical CEC process can lead to an erroneous declaration of non-equivalence of two electronic design representations, when, in fact, the two representations are equivalent.

Sequential equivalence checking (SEC) process is a compositional verification technique commonly used in electronic design automation (EDA), commonly used during the development of digital integrated circuits. SEC can be used to formally prove that two representations of a DUT exhibit the same behavior, using formal verification. This process typically involves assuming equivalence of the DUT inputs and proving or disproving equivalence of the DUT outputs.

SEC typically involves finding pairs of internal candidate points that are potentially equivalent in two representations of the DUT. These points are sometimes referred to as mapping pairs. Mapping pairs may be used for abstractions, e.g., as cutpoints (abstracted environments). The abstractions may be parts of the entire DUT. Starting off a formal validation proof from each of these cutpoints and using an assume-guarantee (AG) proof that assumes the equivalence of the cutpoints, the validation process to formally prove the equivalence of the abstracted environments (e.g., the corresponding parts of the two representations) may be performed in parallel.

Abstractions typically have the potential to significantly reduce the verification task to smaller tasks, which may be easier and faster to complete. Such abstractions are typically sound but not complete. For example, a successful proof on the abstracted representation is typically valid in the unabstracted representation, but failure of the proof, in the abstracted representation, may not necessarily be present in the unabstracted representation. Disproved mapping pairs (e.g., failed mapping pairs, failures on mapping pairs or simply failures) may be discarded from the abstracted representations, creating new abstracted representations, from which the failed cutpoints that are removed, and the new representations undergo a repeated formal verification proof. The process of finding failed cutpoints, removing them from the abstracted representations and repeating the proof until all remaining abstractions are proven may be very long and require substantial computing resources until the two representations of the DUT are determined to be equivalent.

A hardware design is synchronized by a clock, where the values of the signals are updated every clock cycle (the clock toggle). A trace of a design is a presentation of values of tracked signals during a sequence of clock cycles. A failed mapping pair may typically be detected by identifying respective DUT trace (e.g., of the two representations) that demonstrate mismatched values between the two points of the mapping pair. The number of clock cycles in a trace is generally referred to as the trace length. Each of the clock cycles in a trace can be represented as a set of tracked values.

Typically, when performing SEC, in some instances, it may not be necessary to verify the equivalence of all internal parts within the two representations of the DUT. A typical goal in SEC is to determine that when external inputs (respective inputs into the two representations of the DUT) are assumed to be equivalent, external outputs (respective outputs of the two representations of the DUT) can be proven to be equivalent too. In some instances, internal respective parts in the two representations of the DUT may be the subject of SEC, where, in such instances, the inputs to an internal part of the DUT may be treated as outputs of a preceding part in the DUT, and the outputs of that internal part may be treated as inputs to the next part.

As a DUT typically includes many components that are to be proven, a convergence time (e.g., the time required to complete the proof over the entire DUT or the time needed to decide to stop and move on) of a SEC process to be very long.

It is not uncommon for SEC to last for long hours (e.g., 48 hours), sometimes days (e.g. a week), without reaching a conclusion (either presenting a valid proof that the two representations of the DUT are equivalent or finding a counter example (CEX) invalidating the assumed equivalence of the two representations of the DUT).

SUMMARY OF THE INVENTION

There is provided, according to some embodiments of the present invention, a method for enhancing performance of sequential equivalence checking (SEC) on two representations of an electronic design, a first representation of said two representations being a representation of the electronic design toggled by a gated clock that is controlled by an enable combinational logic, and a second representation of said two representations being a representation of the electronic design toggled by a constantly toggling clock.

The method may include, using a computer, selecting one or a plurality of pairs of correlated flip-flops (FFs), a first FF of each pair of the selected one or a plurality of pairs of correlated FFs in the first representation and a second FF of that pair correlating to the first FF in the second representation, said one or a plurality of pairs of correlated FFs selected for not being determined either as equivalent or non-equivalent when SEC was performed on the two representations.

The method may also include, using a computer, defining a modified enable combinational logic for the gated clock, as a disjunction of the enable combinational logic of the gated clock and an enable combinational logic for the first FF of each of the selected one or a plurality of pairs of correlated FFs that is toggled by the gated clock.

The method may also include, using a computer, performing SEC on the two representations of the electronic design, using the modified enable combinational logic for the gated clock instead of the enable combinational logic of the gated clock.

According to some embodiments of the present invention, the representations are HDL models.

According to some embodiments of the present invention, the method may further include, using a computer, extracting the enable combinational logic for each of the plurality of FFs.

According to some embodiments of the present invention, extracting the enable combinational logic for each FF of the plurality of FFs comprises, using a computer, traversing forward from that FF, and listing all signals downstream the logic flow, ending the traversing forward at another FF or at an external output of the electronic design, and traversing backwards from that FF, listing all signals upstream the logic flow, ending the traversing backwards at another FF, or at an external input, or at signals listed while traversing forward from the FF.

According to some embodiments of the present invention, extracting the enable combinational logic for each FF of the plurality of FFs comprises solving for that FF the Quantified Boolean Formula $\exists Q_{FF} B(Q_{FF}) \mathrel{!}= Q_{FF}$ where B is the driving combinational logic over the listed signals for that FF and $Q_F$ is the output value of that FF.

According to some embodiments of the present invention, solving using QBF comprises using binary decision diagram (BDD).

According to some embodiments of the present invention, a system may be provided, for enhancing performance of sequential equivalence checking (SEC) on two representations of an electronic design, a first representation of said two representations being a representation of the electronic design toggled by a gated clock, and the second representation of said two representations being a representation of the electronic design toggled by a constantly toggling clock.

The system may include memory; and a processor configured to: perform SEC on the two representations of the electronic designs. The processor may also be configured to select one or a plurality of pairs of correlated flip-flops (FFs), a first FF of each pair of said one or a plurality of pairs of correlated FFs in the first representation and a second FF of that pair correlating to the first FF in the second representation, said one or a plurality of pairs of correlated FFs selected for not being determined either as equivalent or non-equivalent in the SEC of the two representations. The processor may also be configured to define a modified enable combinational logic for the gated clock, as a disjunction of the enable combinational logic of the gated clock and an enable combinational logic for first FF of each pair of said one or a plurality of pairs of correlated FFs that is toggled by the gated clock. The processor may also be configured to perform SEC on the two representations of the electronic design, using the modified enable combinational logic for the gated clock instead of the enable combinational logic of the gated clock.

BRIEF DESCRIPTION OF THE DRAWINGS

In order to better understand the present invention, and appreciate its practical applications, the following figures are provided and referenced hereafter. It should be noted that the figures are given as examples only and in no way limit the scope of the invention. Like components are denoted by like reference numerals.

DETAILED DESCRIPTION OF EMBODIMENTS OF THE INVENTION

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

Some embodiments of the invention relate to methods and systems for enhancing convergence when performing SEC on two representations of a DUT—a first representation with clock gating and a second representation without clock gating. According to some embodiments of the invention, when verifying clock gated design, one of the two representations of the DUT is a model (e.g., HDL—model) of the clock gated DUT and the other representation is a copy of the model in which the clock always toggles. One aim of clock gating the SEC can be to verify that two models of a DUT can produce the same output sequence per a given input sequence. The two models of the DUT can be one clock gated model and another model with clock or clocks that toggle constantly.

When performing SEC over clock gated/non-clock gated circuit representations, there can be three possible outcomes: a) the two representations that are verified to be equivalent; b) a counter example (CEX) is found that indicates that the two representations are not equivalent; or c) the SEC process does not converge neither a) nor b) are determined, for a long period of time (e.g., hours or days). Formal SEC on representations of clock gated/non-clock gated circuit designs presents a PSPACE complete problem (in computational complexity theory, PSPACE may be the set of all decision problems that can be solved by a Turing machine using a polynomial amount of space). As such, any solver application of SEC over clock gated/non clock gated circuit representation may be prone to a worst-case complexity that is exponential with respect to the size of the design. HDL representations of designs may include thousands, tens of thousands, hundred thousands, millions, etc., of flip flops, completing a SEC process on HDL representations may take many days or may even never converge. Commercial and academic EDA tools typically use heuristics to perform SEC on clock gated circuits. Such heuristics may be efficient on many real-life commercial HDL models.

According to some embodiments of the present invention, when performing SEC over clock gated/non clock gated electronic design representations using an EDA tool, the user may be offered by the EDA to modify the enabling signal of one or a plurality of gated clocks in the electronic design representation of the gated clock, in order to increase the possibility of faster converging of the SEC process, thereby providing a trade-off between a possibly slightly less efficient modified electronic design, and an unmodified electronic design that cannot be verified, presenting a risk of incorrect behavior (e.g., a bug).

Figure 1:
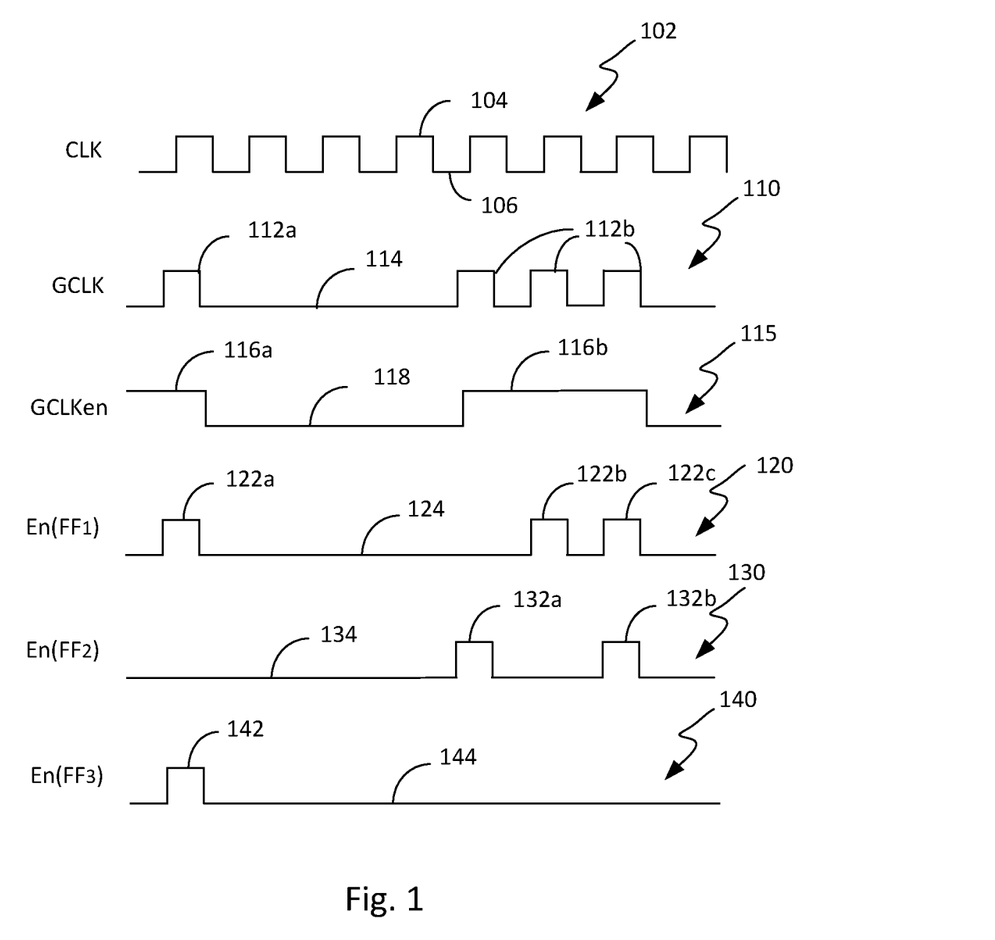
FIG. 1 is a timing diagram of several signals relating to a clock gated electronic design, according to some embodiments of the invention.

FIG. 1 is a timing diagram of several signals relating to a clock gated electronic design, according to some embodiments of the present invention. Clock (CLK) signal 102 is a clock toggling signal of zero (0, or "low") 106 and one (1 or "high") 104 at a steady pace (the clock frequency). A clock that is not gated typically generates such signal 102. A gated version of that clock GCLK may be controlled by an enable combinational logic for enabling or disabling the clock signal, so as to toggle any flip flop that is connected and controlled by that clock. For example, GCLK signal 110 that toggles 112a during a first single-cycle of the respective non-gated clock (CLK) signal and later on toggles during three consecutive clock cycles that coincide with three consecutive toggles 112b of the CLK signal 110.

GCLKen signal 115 is the enable combinational logic of the gated clock. It is high 116a when the gated clock has to generate a first toggle signal 112a, followed by a low signal 114 and later on again high 116b, to enable the three consecutive toggles 112b.

Each of the signals below—120, 130 and 140—map to a respective virtual enable combinational logic of a flip-flop (FF) which is toggled by the GCLK signal 110. The virtual enable combinational logic of a certain FFx (x being a uniquely identifying integer number) is hereinafter referred to as "FFx enable combinational logic", or "En(FFx)".

En(FF1) signal 120 includes a first high 122a that coincides with the high 112a of GCLK signal 110, followed by a low 124 and two consecutive highs 122b and 122c coinciding with the middle and end of high 112b of GCLK signal 110.

En(FF2) signal 130 includes a low 134 and then a first high 132a, followed by a single-cycle low and another high 132b, both of which coincide with high 112b of GCLK signal 110.

En(FF3) signal 140 includes a first high 142 that coincides with the high 112a of GCLK signal 110, followed by a lengthy low 144.

To facilitate proper functioning of each of the FFs, the GCLK enable combinational logic 115 can be high whenever any of the FFs has to read data. Failure to keep the enable combinational logic 115 high whenever any of the FFs has to read data may result in failure to determine equivalence of the FFs and/or can result in a failure to verify the equivalence of the two representations of the electronic design.

One difference between the two representations of an electronic design is the behavior of the clock. Typically, the SEC process involves reducing the task to smaller tasks by selecting pairs of correlating cut points and running the formal verification process (SEC) on these pairs of cut points (e.g., FFs, wires). In many instances the SEC process on cut points may fail to produce a proof or find a CEX, because it may be hard to proove that an internal signal at a cut point is not meant to obtain a new value when the gated clock is turned off (and therefore not toggling).

An enable combinational logic or expression (sometimes also referred to as "qualifier") for a FF may be used to indicate when the FF is expecting a new value from an incoming signal. If it can be shown that whenever the gated clock that toggles the FF is turned off that FF is not expecting a new value (when the enable combinational logic is low at the time the gated clock is turned off) then that FF may be determined to be functioning properly under the gated clock regime. If this is shown then that FF and its correlated FF in the other representation of the electronic design (which is toggled by a constantly operating clock) may be declared to be equivalent.

Figure 2A:
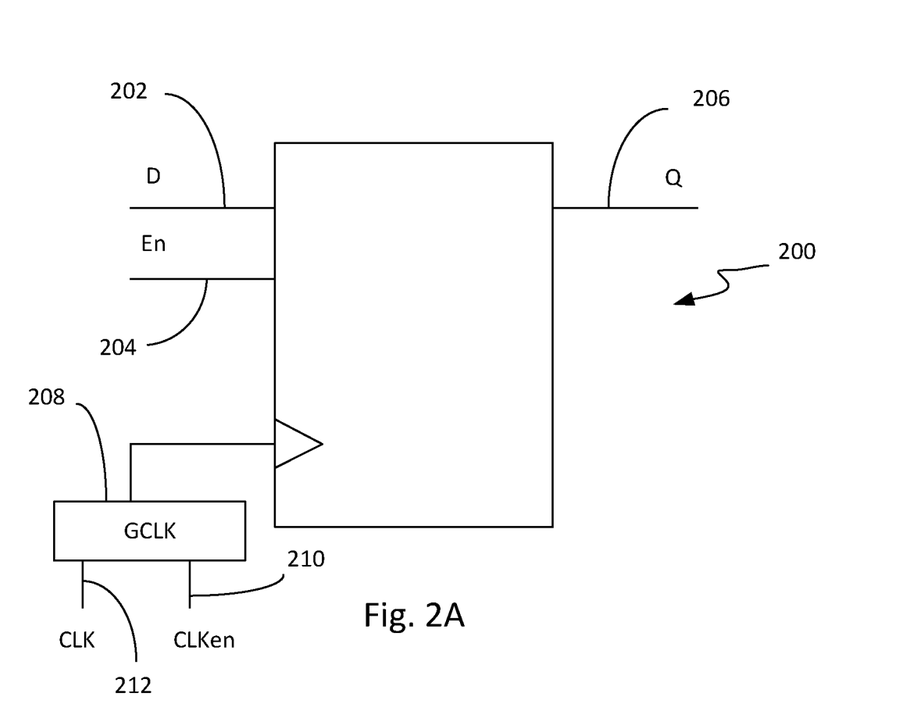
FIG. 2A is a block diagram of a FF toggled by a gated clock, according to some embodiments of the invention.

FIG. 2A is a block diagram of a FF 200 toggled by a gated clock (GCLK) 208. A data (D) input port 202 feeds the FF 200 with incoming data. Enable combinational logic (En) 204 indicates, when high, that data needs to be provided to FF. GCLK passes a clock toggle signal 212, when CLKen signal 210 is high. Q 206 is the output port through which data that was saved in the FF is output.

Figure 2B:
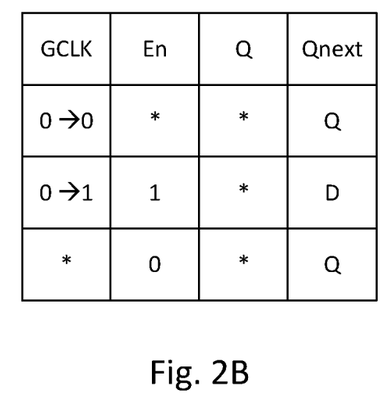
FIG. 2B is a status table showing behavior of the FF shown in FIG. 2A under various GCLK values and other conditions, according to some embodiments of the invention.

FIG. 2B is a status table showing the behavior of the FF shown in FIG. 2A under various GCLK and other conditions. If the incoming GCLK signal was and remains low (0), regardless of the status of the enable combinational logic and/or the status of Q, the next Q output remains the same (Q). When the gated clock toggles—the incoming GCLK signal changes from low (0) to high (1)—and the enable combinational logic is high (1), the next Q output is D. If the enable combinational logic is low (0), then the output Q remains Q.

If it can be proven that whenever the GCLK is turned off the enable combinational logic for the FF is low, then it may be determined that, the two representations of the electronic design are equivalent at that FF. However, such proof may be very hard to obtain.

According to some embodiments of the present invention an EDA tool may define (e.g., pending a command or a confirmation from a user of the EDA tool) a modified GCLK enable combinational logic, for example, denoted by GCLKen*, wherein $$GCLKen^* = GCLKen \| FF1en \| FF2en \| FF2en \ldots \| FFnen \quad (1)$$

where GCLKen—the modified gated clock enable combinational logic—is a disjunction of the original gated clock enable combinational logic, and FF1en to FFnen each of which are the enable combinational logic of each of the n FFs that are toggled by that gated clock, which were not determined either as equivalent or non-equivalent in SEC that was performed on the two representations.

Equation 1 dictates that whenever either the gated clock original enable combinational logic or any of the enable combinational logic of each of the FFs that are toggled by that gated clock is high, the modified gated clock enable combinational logic would also be high.

In a more compact representation of equation 1, the disjunction of expressions FF1en‖FF2en‖FF2en . . . ‖FFnen may be denoted by D so that $$GCLKen^* = GCLKen \| D \quad (2)$$

Modifying the gated clock enable combinational logic may cause a real change in the electronic design, but should not affect the functionality of that electronic design. It may be fairly safe to assume that the modified gated clock enable combinational logic will not be drastically changed with respect to the original enable combinational logic of the gated clock, however minor change or changes—if indeed resulting from the newly defined modified gated clock enable combinational logic may effect faster convergence of the SEC process over the two representations of the electronic design.

The EDA tool may be configured to run the formal validation process for a short period of time (e.g., a few minutes) to determine whether the enable combinational logic FFen of FF is a good candidate for modifying the enable combinational logic of the gated clock. If in the shortly run formal validation process it is determined that FFen is not a good representation of the gated clock enable signal, then it is not used in the modified gated clock enable combinational logic.

According to some embodiments of the present invention, the enable combinational logic for each FF (toggled by the gated clock) may be extracted as follows.

For each FF (e.g., FFn), traversing forward (downstream of the logic path) from that FF, all signals (e.g., at logic gates, wires) are listed. The traversing forward ends at another FF or at an external output of the electronic design, and the listed signals may be denoted "combinational fanout" (comb_fanout in short).

Further, for each FF, traversing backwards (upstream of the logic path) from that FF, all signals (e.g., at logic gates, wires) are listed. The traversing backwards ends at another FF, at an external input of the electronic design, or signals included in a previously defined "comb_fanout" of the FF, and the listed signals may be denoted "relevant fanin".

The listed signals of the comb_out and relevant_fanin for a given flip flop FFn, may be denoted T(FFn). If FFn is not pushing itself (returning a value to its own input D) this FFn may be ignored and not included in the disjunction.

According to some embodiments of the invention extracting the enable combinational logic for each FF of the plurality of FFs comprises solving for that FF the Quantified Boolean Formula $\exists Q_{FF} \cdot B(Q_{FF}) != Q_{FF}$ where B is the driving combinational logic over the listed signals for that FF and $Q_F$ is the output value of that FF.

An example (in pseudo-code) for extracting an enable combinational logic for a FF(C) is given below:

reg a;
input clk, a, d;
always @(posedge clk1)
  begin
    if(d)c<=a;
    else c<=c;
  end
comb_fanout=c, relevant_fanin={d, c, a}, D(c)={a, c, d},
B(c)=(d & a)|(!d & c) Boolean function of flop C
$\exists c \cdot (((d \& a) | (!d \& c)) != c)$
Where the solution is d.

Figure 3:
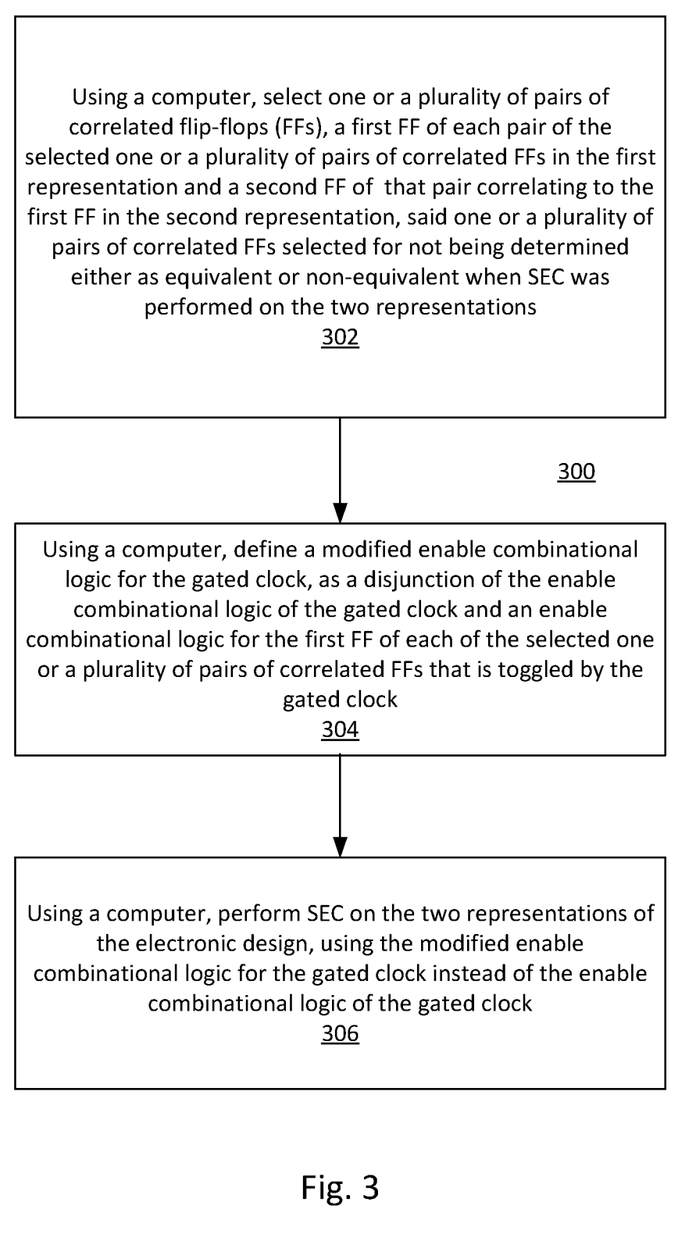
FIG. 3 is a flow chart of a method for enhancing performance of SEC on two representations of an electronic device, according to some embodiments of the invention.

FIG. 3 is a diagram of a computerized method 300 for enhancing performance of sequential equivalence checking (SEC) on two representations of an electronic design, a first representation of said two representations being a representation of the electronic design toggled by a gated clock that is controlled by an enable combinational logic, and a second representation of said two representations being a representation of the electronic design toggled by a constantly toggling clock, according to some embodiments of the invention.

Method 300 may include, using a computer, selecting 302 one or a plurality of pairs of correlated flip-flops (FFs), a first FF of each pair of the selected one or a plurality of pairs of correlated FFs in the first representation and a second FF of that pair correlating to the first FF in the second representation, said one or a plurality of pairs of correlated FFs selected for not being determined either as equivalent or non-equivalent when SEC was performed on the two representations.

Method 300 may also include, using a computer, defining 304 a modified enable combinational logic for the gated clock, as a disjunction of the enable combinational logic of the gated clock and an enable combinational logic for the first FF of each pair of said one or a plurality of pairs of correlated FFs that is toggled by the gated clock.

Method 300 may also include, using a computer, performing 306 SEC on the two representations of the electronic design, using the modified enable combinational logic for the gated clock instead of the enable combinational logic of the gated clock.

In some embodiments, the method may include performing SEC on the two representations of the electronic design before selecting the one or a plurality of pairs of correlated FFs. The method may also include performing SEC on the two representations of the electronic design before selecting the one or a plurality of pairs of correlated FFs for a predetermined period of time. The predetermined period of time may be obtained from a user using a user interface to the EDA tool performing the method.

In some embodiments of the present invention, the representations may be HDL models.

In some embodiments of the present invention, the method may also include, using a computer, extracting the enable combinational logic for each of the plurality of FFs.

In some embodiments of the present invention, extracting the enable combinational logic for each of the plurality of FFs comprises, using a computer, traversing forward from that FF, and collecting all signals, ending the traversing forward at another FF or at an external output of the electronic design, and traversing backwards from that FF, listing all signals, ending the traversing backwards at another FF, or at an external input, or at signals collected while traversing forward from the FF According to some embodiments of the present invention, extracting the enable combinational logic for each FF of the plurality of FFs may include solving for that FF the Quantified Boolean Formula $\exists Q_{FF} \cdot B(Q_{FF}) \mathrel{!=} Q_{FF}$ where B is the driving combinational logic over the listed signals for that FF and $Q_F$ is the output value of that FF.

According to some embodiments of the present invention, when solving the QBF binary BDD may be used.

Figure 4:
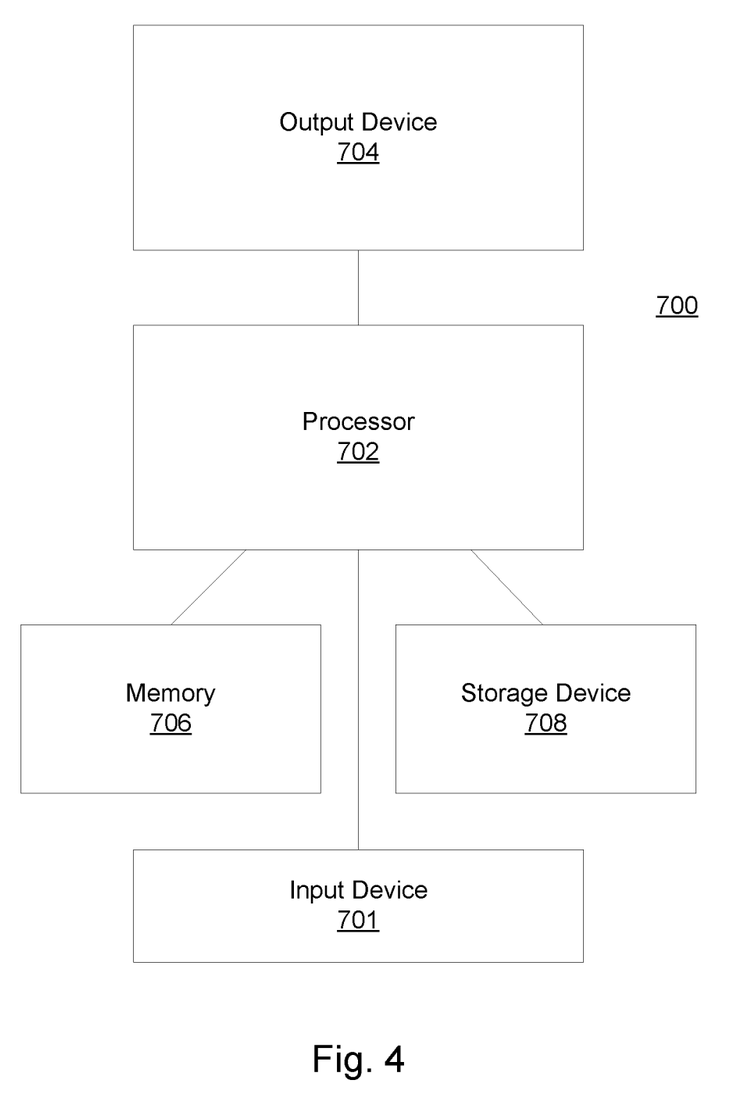
FIG. 4 is a block diagram of a system for enhancing performance of SEC on two representations of an electronic device, according to some embodiments of the invention.

FIG. 4 is a block diagram of a system for enhancing performance of SEC on two representations of an electronic device—a first representation with a gated clock and a second representation with a constantly toggling clock, according to some embodiments of the present invention. System 700 may include a processor 702 (e.g. single processor or a processing unit made that includes a plurality of processors, on a single machine or distributed on a plurality of machines) for executing a method according to some embodiments of the present invention. Processing unit 702 may be configured to perform a method according to some embodiments of the present invention and perform other actions and processing according to some embodiments of the present invention.

Processor 702 may be linked with memory 706 on which a program implementing a method according to some embodiments of the present invention and corresponding data may be loaded and run from, and storage device 708, which includes a non-transitory computer readable medium (or mediums) such as, for example, one or a plurality of hard disks, flash memory devices, etc. on which a program implementing a method according to some embodiments of the present invention and corresponding data may be stored. System 700 may further include an output device 704 (e.g. display device such as CRT, LCD, LED, OLED etc.) on which one or a plurality user interfaces associated with a program implementing a method according to some embodiments of the present invention and corresponding data may be presented. System 700 may also include input interface 701, such as, for example, one or a plurality of keyboards, pointing devices, touch sensitive surfaces (e.g. touch sensitive screens), etc. for allowing a user to input commands and data.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. A computerized method for enhancing performance of sequential equivalence checking (SEC) on two representations of an electronic design, a first representation of said two representations being a representation of the electronic design toggled by a gated clock that is controlled by an enable combinational logic, and a second representation of said two representations being a representation of the electronic design toggled by a constantly toggling clock, the method comprising:

using a computer, selecting one or a plurality of pairs of correlated flip-flops (FFs), a first FF of each pair of the selected one or a plurality of pairs of correlated FFs in the first representation and a second FF of that pair correlating to the first FF in the second representation, said one or a plurality of pairs of correlated FFs selected for not being determined either as equivalent or non-equivalent when SEC was performed on the two representations;

using a computer, defining a modified enable combinational logic for the gated clock, as a disjunction of the enable combinational logic of the gated clock and an enable combinational logic for the first FF of each of the selected one or a plurality of pairs of correlated FFs that is toggled by the gated clock; and using a computer, performing SEC on the two representations of the electronic design, using the modified enable combinational logic for the gated clock instead of the enable combinational logic of the gated clock.

2. The method of claim 1, wherein the representations are HDL models.

3. The method of claim 1, further comprising using a computer, extracting the enable combinational logic for each FF of the plurality of FFs.

4. The method of claim 3, wherein extracting the enable combinational logic for each FF of the plurality of FFs comprises, using a computer, traversing forward from that FF, and listing all signals downstream the logic flow, ending the traversing forward at another FF or at an external output of the electronic design, and traversing backwards from that FF, listing all signals upstream the logic flow, ending the traversing backwards at another FF, or at an external input, or at signals listed while traversing forward from that FF.

5. The method of claim 4, wherein extracting the enable combinational logic for each FF of the plurality of FFs comprises solving for that FF the Quantified Boolean Formula $\exists Q_{FF} \cdot B(Q_{FF}) \mathrel{!}= Q_{FF}$ where B is the driving combinational logic over the listed signals for that FF and $Q_{FF}$ is the output value of that FF.

6. The method of claim 5, wherein solving the Quantified Boolean Formula comprises using binary decision diagram.

7. A system for enhancing performance of sequential equivalence checking (SEC) on two representations of an electronic design, a first representation of said two representations being a representation of the electronic design toggled by a gated clock that is controlled by an enable combinational logic, and a second representation of said two representations being a representation of the electronic design toggled by a constantly toggling clock, the system comprising:

memory; and
a processor configured to:
perform SEC on the two representations of the electronic design;
select one or a plurality of pairs of correlated flip-flops (FFs), a first FF of each pair of said one or a plurality of pairs of correlated FFs in the first representation and a second FF of that pair correlating to the first FF in the second representation, said one or a plurality of pairs of correlated FFs selected for not being determined either as equivalent or non-equivalent in the SEC of the two representations;

define a modified enable combinational logic for the gated clock, as a disjunction of the enable combinational logic of the gated clock and an enable combinational logic for first FF of each pair of said one or a plurality of pairs of correlated FFs that is toggled by the gated clock; and perform SEC on the two representations of the electronic design, using the modified enable combinational logic for the gated clock instead of the enable combinational logic of the gated clock.

8. The system of claim 7, wherein the processor is configured to perform the SEC on the two representations for a predetermined period of time before selecting said one or a plurality of pairs of correlated FFs.

9. The system of claim 8, wherein the predetermined period of time is set by a user.

10. The system of claim 7, wherein the representations are HDL models.

11. The system of claim 7, wherein the processor is further configured to extract the enable combinational logic for each FF of the plurality of FFs.

12. The system of claim 9, wherein in extracting the enable combinational logic for each FF of the plurality of FFs the processor is configured to traverse forward from that FF, and list all signals upstream the logic flow, ending the traversing forward at another FF or at an external output of the electronic design, and to traverse backwards from that FF, and list all signals, ending the traversing backwards at another FF, or at an external input, or at signals listed while traversing forward from that FF.

13. The system of claim 12, wherein extracting the enable combinational logic for each FF of the plurality of FFs comprises solving for that FF the Quantified Boolean Formula $\exists Q_{FF} \cdot B(Q_{FF}) \mathrel{!}= Q_{FF}$ where B is the driving combinational logic over the listed signals for that FF and $Q_{FF}$ is the output value of that FF.

14. The system of claim 13, wherein solving the Quantified Boolean Formula comprises using binary decision diagram.

15. A non-transitory computer readable storage medium for enhancing performance of sequential equivalence checking (SEC) on two representations of an electronic design, a first representation of said two representations being a representation of the electronic design toggled by a gated clock that is controlled by an enable combinational logic, and a second representation of said two representations being a representation of the electronic design toggled by a constantly toggling clock, non-transitory computer readable storage medium having stored thereon instructions that when executed by a processor will cause the processor to:

perform SEC on the two representations of the electronic design for a predetermined period of time;

select one or a plurality of pairs of correlated flip-flops (FFs), a first FF of each pair of said one or a plurality of pairs of correlated FFs in the first representation and a second FF of that pair correlating to the first FF in the second representation, said one or a plurality of pairs of correlated FFs selected for not being determined either as equivalent or non-equivalent in the SEC of the two representations;

define a modified enable combinational logic for the gated clock, as a disjunction of the enable combinational logic of the gated clock and an enable combinational logic for first FF of each pair of said one or a plurality of pairs of correlated FFs that is toggled by the gated clock; and perform SEC on the two representations of the electronic design, using the modified enable combinational logic for the gated clock instead of the enable combinational logic of the gated clock.

16. The non-transitory computer readable storage medium of claim 15, wherein the representations are HDL models.

17. The non-transitory computer readable storage medium of claim 15, wherein the processor is further configured to extract the enable combinational logic for each FF of the plurality of FFs.

18. The non-transitory computer readable storage medium of claim 17, wherein in extracting the enable combinational logic for each of the plurality of FFs the processor is configured to traverse forward from that FF, and list all signals downstream the logic flow, ending the traversing forward at another FF or at an external output of the electronic design, and to traverse backwards from that FF, list all signals upstream the logic flow, ending the traversing backwards at another FF, or at an external input, or at signals listed while traversing forward from that FF.

19. The non-transitory computer readable storage medium of claim 15, wherein extracting the enable combinational logic for each FF of the plurality of FFs comprises solving for that FF the Quantified Boolean Formula $\exists Q_{FF} \cdot B(Q_{FF})$ != $Q_F$ where B is the driving combinational logic over the listed signals for that FF and $Q_F$ is the output value of that FF.

20. The non-transitory computer readable storage medium of claim 19, wherein solving the QBF comprises using binary decision diagram.

\* \* \* \* \*